F. H. MILLER.
SAFETY DEVICE FOR STARTING MOTORS.
APPLICATION FILED JUNE 24, 1913. RENEWED DEC. 16, 1914.
1,130,004. Patented Mar. 2, 1915.
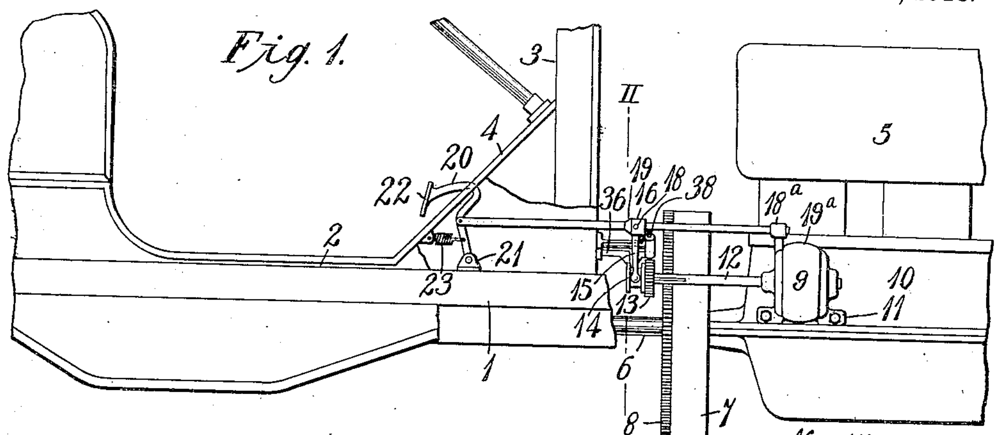
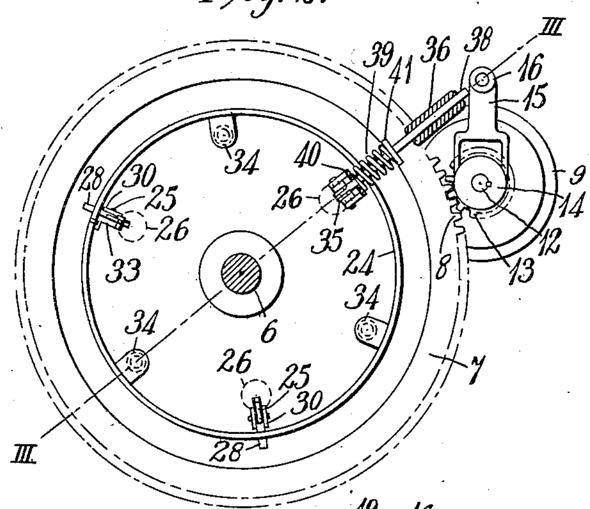
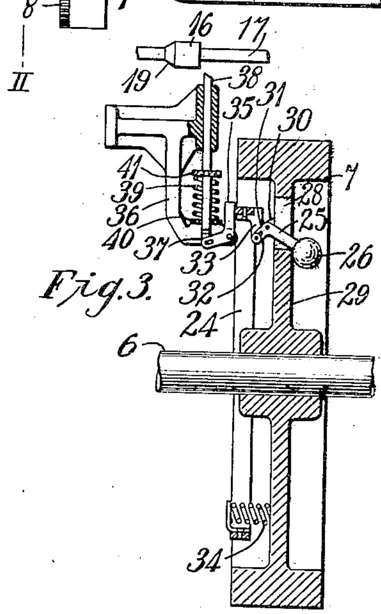
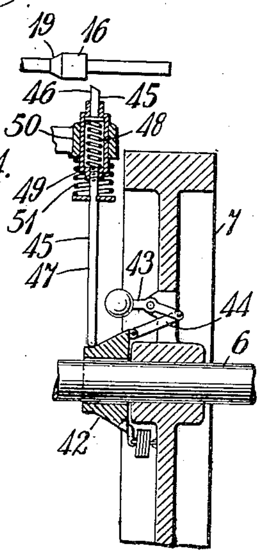
WITNESSES:
J. R. Langley
J. H. Procter
INVENTOR
Frederick H. Miller
BY
Wesley G. Carr
ATTORNEY

UNITED STATES PATENT OFFICE.

FREDERICK H. MILLER, OF WILKINSBURG, PENNSYLVANIA, ASSIGNOR TO WESTINGHOUSE ELECTRIC AND MANUFACTURING COMPANY, A CORPORATION OF PENNSYLVANIA.

SAFETY DEVICE FOR STARTING-MOTORS.

1,130,004. Specification of Letters Patent. Patented Mar. 2, 1915.

Application filed June 24, 1913, Serial No. 775,491. Renewed December 16, 1914. Serial No. 877,613.

*To all whom it may concern:*

Be it known that I, FREDERICK H. MILLER, a citizen of the United States, and a resident of Wilkinsburg, in the county of Allegheny and State of Pennsylvania, have invented a new and useful Improvement in Safety Devices for Starting-Motors, of which the following is a specification.

My invention relates to starting devices for automobiles, and it has particular reference to a centrifugally controlled interlock for starting motors.

My invention has for its object to provide a device which will protect the gears of a starting motor for an automobile engine by preventing the connection of the motor to the engine shaft when the latter is rotating above a predetermined speed.

In the practice of starting motors for gas engines, it is customary to connect the motor to the fly wheel of the engine by means of reduction-gear mechanism, the connection being respectively made and broken by the operator before and after starting.

If the gears should be placed in mesh during the operation of the engine and the rotation of the fly-wheel at a high rate of speed, damage to the gears would almost inevitably result. It is essential, therefore, that a safety device be used, in connection with a mechanism of this character, to prevent the accidental or inadvertent meshing of the gears when the engine is in operation.

In my invention, I propose to use a centrifugally controlled mechanism for rendering the starting pedal or starting shaft inoperative when the engine is operating under its own power.

My invention is described in detail, in connection with the accompanying drawings, in which—

Figure 1 is a fragmentary side elevation of an automobile equipped with my device. Fig. 2 is an enlarged view, taken along the line II—II of Fig. 1, and Fig. 3 is a view, in section, taken along the line III—III of Fig. 2. Fig. 4 is a fragmentary view, in section, of a modified form of my invention.

Referring now to the structure illustrated in the drawings, a chassis or frame 1 of an automobile, having a floor 2, a dash-board 3 and a footboard 4, is provided with a gas engine 5, only a portion of which is shown, and an engine shaft 6, upon which is mounted a fly-wheel 7 having gear teeth 8. A starting motor 9 is supported upon a crank case 10 by means of a bracket 11, and is provided with a shaft 12, upon which is slidably keyed, a pinion 13 having an integral grooved collar 14. The pinion 13 is actuated by a yoke member 15, one end of which fits into the grooved collar 14 and the other end of which terminates in a collar 16. The collar 16 is rigidly attached to a starting shaft 17 by means of a pin 18 and has a beveled or tapered end 19 for a purpose to be hereinafter described. The starting shaft 17 is slidably mounted at one end in a bearing 18ª attached to a motor frame 19ª and at the other end to an operating lever 20. The lever 20 is pivoted to a lug 21, rigidly attached to the floor 2, and extends through an opening in the footboard 4 to a pedal 22, with which it is provided. A spring 23 extends between the operating lever 20 and the footboard 4, being connected thereto and tending to hold the starting mechanism in the normal or non-actuating position. A ring 24 is held in position around the engine shaft 6 by a plurality of weighted bell crank members 25 and is adapted to have a lateral reciprocatory movement that is responsive to the starting and stopping of the engine. Each of the bell crank members 25, having a weight 26 at the end of its longer arm 27, extends through a slot 28 in a web 29 of the fly wheel 7 and is pivoted to a lug 30 in the web 29. The shorter arm 31 of the bell crank member 25 is connected to the annular ring 24 by a pin-and-slot connection 32 and a lug 33. Compression springs 34, mounted upon the web 29, tend to force the ring 24 away from the fly wheel 7 and into engagement with a bell crank 35. The bell crank 35 is pivoted to a stationary bracket 36 that is attached to the dashboard 3 and is connected by a pin-and-slot connection 37 to a locking rod 38 which is slidably mounted in the bracket 36 and is adapted to be reciprocated vertically into and out of the lateral path of travel of the collar 16. A spring 39 extending between a shoulder 40 on the bracket 36 and a collar 41 on the locking rod 38 opposes the action of the ring 24 against the bell crank 35 and tends to move the locking rod into the path of the collar 16.

Assuming the parts shown in the drawings to be in the stationary or starting position, the action of the device is as follows: When the operator desires to start the engine, the pedal 22 is pressed forward against the action of the spring 23 to effect engagement of the pinion 13 with the gear 8. The motor 9 is then started by any well known means not shown, to impart rotative movement to the engine shaft 6 through the motor shaft 12, pinion 13 and gear 8. When the engine 5 operates under its own power, the operator releases the pedal 22 and the pinion 13 is withdrawn from mesh with the gear 8 by the action of spring 23. The rotation of the fly wheel 7 causes the bell cranks 25 to be rotated about their pivotal points in a counterclockwise direction by the action of centrifugal force upon the weights 26. This action causes the ring member 24 to be drawn toward the fly wheel 7 to release the bell crank 35. Thus released, the bell crank 35 permits the locking rod 38 to move into the path of the collar 16 by the action of spring 39. Under these conditions, it is readily seen that, should the operator accidentaly or inadvertently attempt to operate the pedal 22, the collar 16 would come into contact with the locking rod 38 and thereby prevent the pinion 13 from engaging the gear 8 while the latter was running at a high rate of speed and preclude the possibility of stripped gears or damage.

Another form of my invention is shown in Fig. 4, similar parts being designated by similar reference characters and being substantially the reverse, in action, of the device above described. In place of a ring, I make use of an annular wedge or cone shaped member 42 which is forced outwardly by centrifugal action, the direction of rotation of the bell crank 43 in this case being clockwise. The bell crank 43 is connected to the member 42 by a link 44 instead of by a pin-and-slot connection. The locking rod 45 comprises four parts, parts 46 and 47 being straight rods connected by a spring 48 by means of a hollow cylindrical body 49 which is slidably mounted in a bracket 50. A spring 51 is located between the bracket 50 and a fixed collar on the lower part 47 of the locking rod 45 and tends, as in the case above described, to hold the rod 45 out of the path of travel of the collar 16. As the engine starts, the cone or wedge-shaped member 42 is forced outwardly, the part 38 of the locking rod 45 rides up the conical surface of the part 42, forcing the whole of the rod 45 comprising parts 46, 47, 48 and 49 upward until the part 46 comes within the path of travel of the collar 16. The spring 51 gives flexibility to the interlocking rod 45 and permits withdrawal of the pinion 13 by allowing the beveled collar 16 to slip by on its releasing movement, should the engine attain sufficient speed to operate the interlocking device before the starting pedal is released by the operator.

The devices herein shown and described may, of course, deviate from the design shown in the drawings and still be within the spirit and scope of my invention, and I, therefore, desire that only such limitations shall be imposed as are indicated in the appended claims.

I claim as my invention:

1. The combination with an engine having a shaft, a starting motor, and means for operatively connecting said motor to said shaft, of means controlled by centrifugal force for preventing the establishment of said operative connection.

2. The combination with an engine having a shaft, a starting motor, and means for operatively connecting said motor to said shaft, of speed-controlled means for preventing the establishment of said operative connection.

3. The combination with an engine having a shaft, a starting motor, and means for operatively connecting said motor to said shaft, of means for preventing the establishment of said operative connection when the engine shaft rotates above a predetermined speed.

4. The combination with an engine having a shaft, a starting motor, and means for operatively connecting said motor to said shaft, of means for preventing the establishment of said operative connection when the engine operates under its own power.

5. The combination with an engine having a shaft, a starting motor, and means for operatively connecting said motor to said shaft, of locking means for preventing the establishment of said operative connection, and means controlled by centrifugal force for actuating said locking means.

6. The combination with an engine having a shaft, a starting motor, means for operatively connecting said motor to said shaft, of locking means for preventing the establishment of said operative connection, and speed-controlled means for actuating said locking means.

7. The combination with an engine having a shaft, a starting motor, means for operatively connecting said motor to said shaft, of locking means for preventing the establishment of said operative connection, and means for actuating said locking means when the engine shaft rotates above a predetermined speed.

8. The combination with an engine having a shaft, a starting motor, means for operatively connecting said motor to said shaft, of locking means for preventing the establishment of said operative connection, and means for actuating said locking means when the engine operates under its own power.

9. The combination with an engine having a shaft provided with gear wheel, a starting motor having a shaft, a pinion on said shaft, and means for operatively connecting said pinion to said gear wheel, of means controlled by centrifugal force for preventing the establishment of said operative connection.

10. The combination with an engine having a shaft, a gear wheel on said shaft, a starting motor having a shaft, a pinion on said shaft, and means for operatively connecting said pinion to said gear wheel, of speed controlled means for preventing the establishment of said operative connection.

11. The combination with an engine having a shaft, a gear wheel on said shaft, a starting motor having a shaft, a pinion on said shaft, and means for operatively connecting said pinion to said gear wheel, of means for preventing the establishment of said operative connection when the engine shaft rotates above a predetermined speed.

12. The combination with an engine having a shaft, a gear wheel on said shaft, a starting motor having a shaft, a pinion on said shaft, and means for operatively connecting said pinion to said gear wheel, of means for preventing the establishment of said operative connection when the engine operates under its own power.

13. The combination with an engine having a shaft, a gear wheel on said shaft, a starting motor having a shaft, a pinion on said shaft, of means for shifting said pinion into mesh with said gear wheel, and locking means for engaging said shifting means to prevent the meshing of said pinion with said gear wheel.

14. The combination with an engine having a shaft, a gear wheel on said shaft, a starting motor, and a pinion operatively connected to said motor, of means for shifting said pinion into mesh with said gear wheel, locking means for engaging said shifting means and comprising a movable pin, a bell crank lever connected by a pin and slot to said pin, and means controlled by centrifugal force for actuating said locking means.

15. The combination with an engine having a shaft, a gear wheel on said shaft, a starting motor, and a pinion operatively connected to said motor, of means for shifting said pinion into mesh with said gear wheel, a locking means for engaging said shifting means, means controlled by centrifugal force for actuating said locking means, said actuating means comprising a plurality of bell crank levers pivotally mounted on said gear wheel, one arm of each lever being provided with a weight, and an annular member operatively connected to the other arm of each of said bell crank levers.

In testimony whereof, I have hereunto subscribed my name this 17th day of June, 1913.

FREDERICK H. MILLER.

Witnesses:
J. R. LANGLEY,
B. B. HINES.